US009760402B2

United States Patent
Shows et al.

(10) Patent No.: US 9,760,402 B2
(45) Date of Patent: Sep. 12, 2017

(54) SYSTEMS AND METHODS FOR INPUT/OUTPUT TRAFFIC SHAPING FOR OPTIMAL PERFORMANCE UNDER THERMAL CONSTRAINTS

(71) Applicant: Dell Products L.P., Round Rock, TX (US)

(72) Inventors: Thomas Alexander Shows, Cedar Park, TX (US); Travis C. North, Cedar Park, TX (US); Deeder M. Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 48 days.

(21) Appl. No.: 14/807,621

(22) Filed: Jul. 23, 2015

(65) Prior Publication Data

US 2017/0024254 A1 Jan. 26, 2017

(51) Int. Cl.
G06F 9/46 (2006.01)
G06F 9/48 (2006.01)
G06F 1/32 (2006.01)

(52) U.S. Cl.
CPC ............ *G06F 9/4893* (2013.01); *G06F 1/329* (2013.01)

(58) Field of Classification Search
None
See application file for complete search history.

(56) References Cited

U.S. PATENT DOCUMENTS

| 5,842,038 | A | 11/1998 | Williams et al. | |
| 6,256,743 | B1 * | 7/2001 | Lin | G06F 1/3203 712/E9.063 |
| 9,015,726 | B2 * | 4/2015 | Barsness | G06F 9/4893 718/105 |
| 9,146,814 | B1 * | 9/2015 | van der Merwe | G06F 11/3031 |
| 9,235,243 | B2 * | 1/2016 | Yeung | G06F 9/4893 |
| 9,335,694 | B2 * | 5/2016 | Fukaya | G03G 21/20 |
| 9,436,628 | B2 * | 9/2016 | Vaishampayan | G06F 13/26 |
| 9,541,976 | B1 * | 1/2017 | Lambert | G06F 1/26 |
| 2002/0065981 | A1 | 5/2002 | Jenne et al. | |

(Continued)

OTHER PUBLICATIONS

International Search Report and Written Opinion, International Patent Application No. PCT/US2016/016323, mailed Apr. 11, 2016, 9 pages.

*Primary Examiner* — Hiren Patel
(74) *Attorney, Agent, or Firm* — Jackson Walker L.L.P.

(57) ABSTRACT

In accordance with embodiments of the present disclosure, an information handling system may include a processor, a target information handling resource for receiving input/output requests from an operating system executing on the processor, and a thermal filter driver comprising a program of instructions embodied in computer-readable media and executable by the processor. The thermal filter driver may be configured to, in response to issuance of one or more input/output requests to the target information handling resource, perform experimentation on an input/output queue comprising the one or more input/output requests and based on the experimentation, determine modifications to be made to the input/output queue in order to provide a minimal impact to performance of input/output requests at the target information handling resource while satisfying thermal constraints of the target information handling resource.

15 Claims, 2 Drawing Sheets

(56) References Cited

U.S. PATENT DOCUMENTS

| | | | |
|---|---|---|---|
| 2005/0216222 A1* | 9/2005 | Inoue | G06F 1/206 |
| | | | 702/136 |
| 2005/0216775 A1* | 9/2005 | Inoue | G06F 1/206 |
| | | | 713/300 |
| 2007/0143763 A1* | 6/2007 | Adachi | G06F 1/206 |
| | | | 718/104 |
| 2009/0204852 A1* | 8/2009 | Diggs | G06F 11/008 |
| | | | 714/42 |
| 2010/0287559 A1* | 11/2010 | Mergen | G06F 9/4893 |
| | | | 718/103 |
| 2011/0099435 A1 | 4/2011 | Wu | |
| 2011/0161712 A1* | 6/2011 | Athalye | G06F 1/206 |
| | | | 713/340 |
| 2013/0110308 A1 | 5/2013 | Pereira | |
| 2013/0275665 A1* | 10/2013 | Saraswat | G11C 7/04 |
| | | | 711/106 |
| 2014/0237175 A1 | 8/2014 | Felch et al. | |
| 2014/0281311 A1* | 9/2014 | Walker | G06F 3/0631 |
| | | | 711/162 |
| 2015/0192978 A1 | 7/2015 | Ghose | |
| 2015/0347330 A1* | 12/2015 | Vaishampayan | G06F 13/26 |
| | | | 710/60 |
| 2016/0011607 A1* | 1/2016 | James | G05B 15/02 |
| | | | 700/300 |

* cited by examiner

SYSTEMS AND METHODS FOR INPUT/OUTPUT TRAFFIC SHAPING FOR OPTIMAL PERFORMANCE UNDER THERMAL CONSTRAINTS

TECHNICAL FIELD

The present disclosure relates in general to information handling systems, and more particularly to traffic shaping of input/output operations in an information handling system in order to satisfy thermal constraints of a target of the input/output operations while optimizing performance of the input/output operations.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As storage devices and other components in information handling systems have increased in clock speed and power consumption, the amount of heat produced by such components as a side-effect of normal operation has also increased. For example, the increased transistor density and high switching speeds of NAND flash devices (e.g., solid state drives) produce a significant amount of heat. Typically, such devices use unsophisticated thermal controls, such as simply decreasing a rate of input/output communication in response to crossing of thermal thresholds.

SUMMARY

In accordance with the teachings of the present disclosure, the disadvantages and problems associated with thermal control related to input/output operations in an information handling system may be reduced or eliminated.

In accordance with embodiments of the present disclosure, an information handling system may include a processor, a target information handling resource for receiving input/output requests from an operating system executing on the processor, and a thermal filter driver comprising a program of instructions embodied in computer-readable media and executable by the processor. The thermal filter driver may be configured to, in response to issuance of one or more input/output requests to the target information handling resource, perform experimentation on an input/output queue comprising the one or more input/output requests and based on the experimentation, determine modifications to be made to the input/output queue in order to provide a minimal impact to performance of input/output requests at the target information handling resource while satisfying thermal constraints of the target information handling resource.

In accordance with these and other embodiments of the present disclosure, a method may include performing experimentation on an input/output queue comprising one or more input/output requests to a target information handling resource and based on the experimentation, determining modifications to be made to the input/output queue in order to provide a minimal impact to performance of input/output requests at the target information handling resource while satisfying thermal constraints of the target information handling resource.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to perform experimentation on an input/output queue comprising one or more input/output requests to a target information handling resource and based on the experimentation, determine modifications to be made to the input/output queue in order to provide a minimal impact to performance of input/output requests at the target information handling resource while satisfying thermal constraints of the target information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
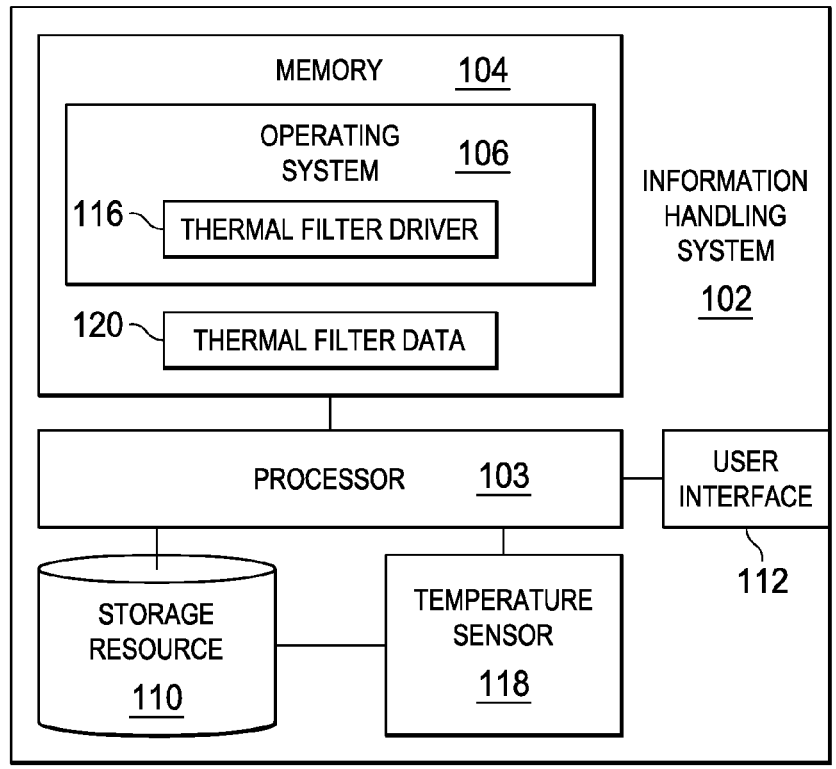
FIG. 1 illustrates a block diagram of an example information handling system, in accordance with certain embodiments of the present disclosure.
Figure 2:
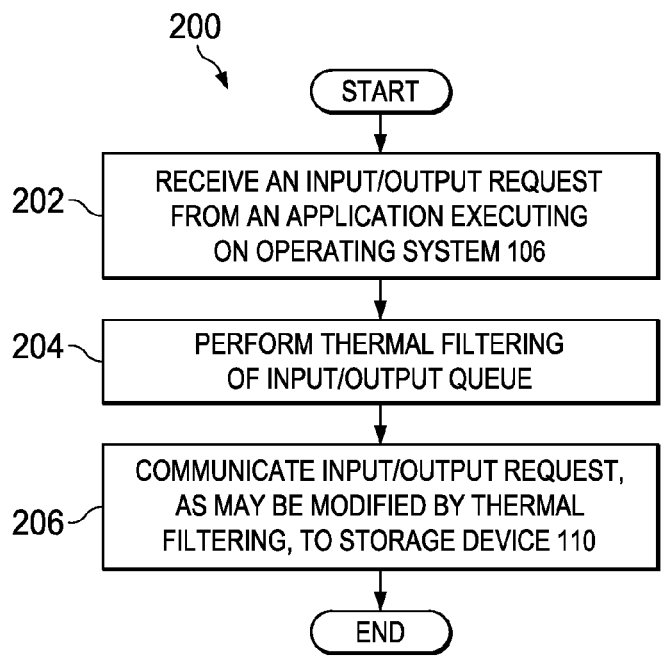
FIG. 2 illustrates a flow chart of an example method for performing an input/output operation, in accordance with certain embodiments of the present disclosure.
Figure 3:
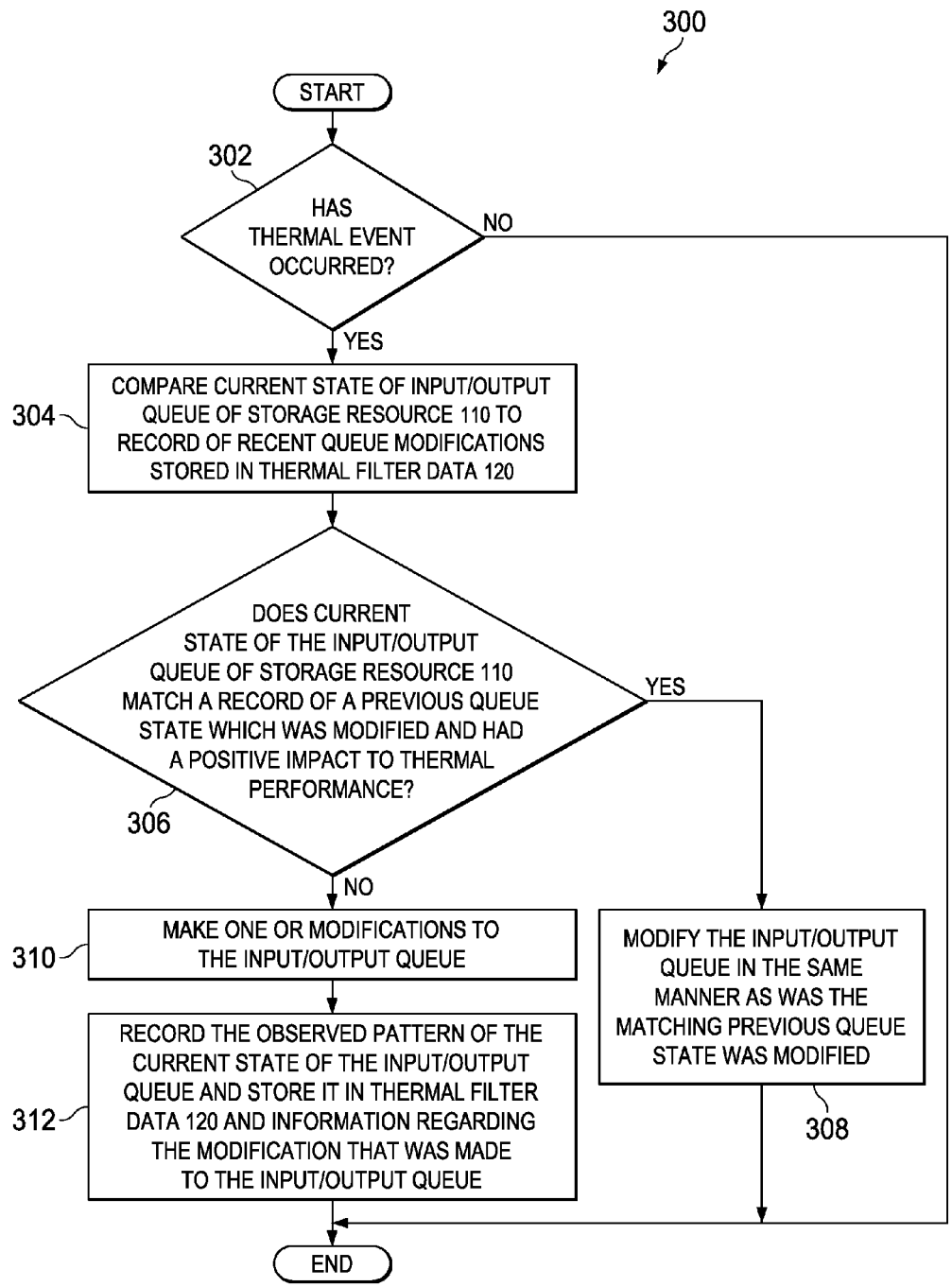
FIG. 3 illustrates a flow chart of an example method for thermal filtering of an input/output operation, in accordance with certain embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a storage resource 110 communicatively coupled to processor 103, a user interface 112 communicatively coupled to processor 103, and one or more temperature sensors 118 thermally coupled to storage resource 110 and communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have operating system 106 stored thereon. Operating system 106 may be any program of executable instructions, or aggregation of programs of executable instructions, configured to manage and/or control the allocation and usage of hardware resources (e.g., processor 103, memory 104, storage resource 110, user interface 112, and/or other information handling resources) and provide an interface between such hardware resources and application programs hosted by operating system 106, and thus may act as a host for application programs to be executed by information handling system 102. Active portions of operating system 106 may be read and executed by processor 103 in order to carry out the functionality of operating system 106. Examples of operating system 106 may include, without limitation, Windows, MacOS, UNIX, LINUX, Android, iOS, or any other closed or open source operating system.

As depicted in FIG. 1, operating system 106 may include a filter thermal driver 116. Thermal filter driver 116 may comprise a program of instructions configured to, when read and executed by processor 103, provide an interface between operating system 106 and storage resource 110. As described in greater detail below, driver 116 may, based on thermal information communicated from temperature sensor 118, shape input/output traffic communicated to storage resource 110 in order to maintain the highest possible performance of input/output communication while satisfying thermal constraints of storage resource 110. In particular, under thermally-challenging conditions (as indicated by temperature sensor 118), filter driver 116 may divert input/output traffic into a machine intelligence algorithm that continuously performs experimentation to determine the fittest input/output modifications to perform on clusters of input/output patterns in order to satisfy thermal constraints of storage resource 110, with the goal of slowing performance of input/output communication only insofar as needed to prevent thermal fail-safe mechanisms of storage resource 110 from being triggered. Such experimentation may comprise any suitable form of learning algorithm, including without limitation genetic experimentation, neural networks, linear regression, decision trees, bagging, boosting, random forest, naïve Bayes experimentation, etc.

As shown in FIG. 1, memory 104 may also include thermal filter data 120 stored thereon. As described in greater detail below, thermal filter data 120 may comprise information stored by thermal filter driver 116 including information regarding input/output queue modifications made by thermal filter driver 116. Such information may include previous queue states which were modified by thermal filter driver 116, the queue modifications made by thermal filter driver 116 to such queue states, impacts of queue modifications to input/output performance, impacts of queue modifications to thermal performance (e.g., impact to temperature sensed by temperature sensor 118), and/or other information regarding queue modifications.

Although operating system 106 and thermal filter data 120 are depicted as being stored on memory 104, in some embodiments, operating system 106 and/or thermal filter data 120 may be stored on storage resource 110 and/or another computer-readable medium, and read into memory 104 for execution by processor 103.

Storage resource 110 may include any system, device, or apparatus configured to store data. Storage resource 110 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 110 may include one or more storage enclosures configured to hold and/or power one or more of such devices. In the embodiments represented by FIG. 1, storage resource 110 may reside within information handling system 102. However, in other embodiments, storage resource 110 may reside external to information handling system 102 (e.g., may be coupled to information handling system 102 via a network). In particular embodiments, storage resource 110 may comprise a solid state drive including NAND flash.

User interface 112 may comprise any instrumentality or aggregation of instrumentalities by which a user may interact with information handling system 102. For example, user interface 112 may permit a user to input data and/or instructions into information handling system 102, and/or otherwise manipulate information handling system 102 and its associated components. User interface 112 may also permit information handling system 102 to communicate data to a user, e.g., by way of a display device.

Temperature sensor 118 may be any system, device, or apparatus (e.g., a thermometer, thermistor, etc.) configured to communicate a signal to processor 103 indicative of a temperature within information handling system 102. In particular embodiments, temperature sensor 118 may sense a temperature within and/or proximate to storage resource 110.

In addition to processor 103, memory 104, storage resource 110, user interface 112, and temperature sensor 118, information handling system 102 may include one or more other information handling resources.

FIG. 2 illustrates a flow chart of an example method 200 for performing an input/output operation, in accordance with certain embodiments of the present disclosure. According to some embodiments, method 200 may begin at step 202. As noted above, teachings of the present disclosure may be implemented in a variety of configurations of information handling system 102.

At step 202, operating system 106 may receive an input/output request from an application executing on operating system 106. At step 204, operating system 106 may issue the input/output request to thermal filter driver 116 for thermal filtering, which is described in greater detail below with respect to method 300. At step 206, the input/output request, as may be modified by thermal filter driver 116, may be issued to storage resource 110. After completion of step 206, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

FIG. 3 illustrates a flow chart of an example method 300 for thermal filtering of an input/output operation, in accordance with certain embodiments of the present disclosure. In some embodiments, method 300 may be used to implement step 204 of method 200. According to some embodiments, method 300 may begin at step 302. As noted above, teachings of the present disclosure may be implemented in a variety of configurations of information handling system 102.

At step 302, thermal filter driver 116 may determine if a temperature event associated with storage resource 110 (e.g., as sensed by temperature sensor 118) has occurred. In some embodiments, the temperature event may comprise a temperature associated with storage resource 110 exceeding a maximum threshold temperature. In these and other embodiments, the temperature event may comprise a temperature associated with storage resource having a rate of increase greater than maximum threshold rate (e.g., which may indicate a likelihood of a temperature exceeding a maximum threshold temperature). In addition, in some embodiments, a smoothing algorithm, such as one that calculates a moving average of temperature or rate of change of temperature, may be used to provide a hysteresis relating to detection of the temperature event. If the temperature event has occurred, method 300 may proceed to step 304. Otherwise, in the absence of a temperature event, method 300 may end.

At step 304, thermal filter driver 116 may compare the current state of the input/output queue of storage resource 110 to a record of recent queue modifications stored in thermal filter data 120. At step 306, thermal filter driver 116 may determine if the current state of the input/output queue of storage resource 110 matches a record of a previous queue state which was modified and had a positive impact to thermal performance. If a pattern match occurs, method 300 may proceed to step 308. If no pattern match occurs, method 300 may proceed to step 310.

At step 308, in response to the current state of the input/output queue matching a previous queue state which modified to have a positive impact to thermal performance, thermal filter driver 116 may modify the input/output queue in the same manner as was the matching previous queue state. In addition, in response to modification of the input/output queue, the impact of the change to thermal performance and to input/output performance (e.g., time to complete input/output operations) may be monitored and tracked to determine if such modification remains an effective modification for thermal control. After completion of step 308, method 300 may end.

At step 310, in response to the current state of the input/output queue failing to match a previous queue state which was modified to have a positive impact to thermal performance, thermal filter driver 116 may make one or more modifications to the input/output queue. Such modifications may be selected randomly, or may be selected based on modifications to a previous queue state that most closely matches the present queue state. Such modifications may include, without limitation, delaying one or more input/output requests, merging an input/output request with a subsequent input/output request in the input/output queue, merging all input/output requests in the input/output queue, splitting an input/output request into separate input/output requests, reordering input/output requests in the input/output queue, and combinations of one or more of the previously-listed modifications.

At step 312, thermal filter driver 116 may record the observed pattern of the current state of the input/output queue and store it in thermal filter data 120, along with information regarding the modification that was made to the input/output queue, a thermal response to the modification (e.g., a change in temperature of temperature sensor 118 as a result of the modification), and a performance response to the modification (e.g., a measure of input/output completion time of the modification). After completion of step 312, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Using method 300, thermal filter driver 116 may continuously perform experimentation on input/output requests to determine modifications to be made to patterns in the input/output queue in order to provide a minimal impact to input/output performance, while satisfying thermal constraints of storage resource 110.

Although the description above has contemplated issuance and thermal filtering of input/output requests to a storage resource 110, the methods and systems herein may also be applied to a target information handling resource of input/output requests and/or communication, including information handling resources which are not storage devices.

As used herein, when two or more elements are referred to as "coupled" to one another, such term indicates that such two or more elements are in electronic communication, thermal communication, or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   a target information handling resource for receiving input/output requests from an operating system executing on the processor; and
   a thermal filter driver comprising a program of instructions embodied in computer-readable media and executable by the processor, the thermal filter driver configured to, in response to issuance of one or more input/output requests to the target information handling resource:
      perform experimentation on an input/output queue comprising the one or more input/output requests, the experimentation including performing one or more modifications of the input/output queue to determine thermal impact resulting from the one or more modifications;
      store results of the experimentation; and
      based on the experimentation, determine additional modifications to be made to the input/output queue in order to provide a minimal impact to performance of input/output requests at the target information handling resource while satisfying thermal constraints of the target information handling resource;
   wherein the thermal filter driver is further configured to, in order to perform experimentation and determine additional modifications:
      determine whether a current state of the input/output queue matches a previous queue state for which a modification was made that had a positive thermal impact to the target information handling resource; and
      responsive to determining that the current state fails to match the previous queue state:
         modify the input/output queue; and
         record a pattern of the current state, the modification made to the input/output queue, a thermal impact associated with the modification, and a performance impact associated with the modification; and
      responsive to determining that the current state matches the previous queue state;
         modify the input/output queue in the same manner as was the previous queue state.

2. The information handling system of claim 1, wherein the target information handling resource comprises a storage resource.

3. The information handling system of claim 2, wherein the storage resource comprises NAND flash.

4. The information handling system of claim 1, wherein the thermal filter driver performs experimentation and determines modifications to the input/output queue responsive to at least one of:
   a temperature associated with the target information handling resource exceeding a threshold maximum temperature; and
   the temperature associated with the target information handling resource having a rate of change exceeding a threshold maximum rate.

5. The information handling system of claim 1, wherein the modifications comprise one or more of:
   delaying one or more input/output requests;

merging an input/output request with a subsequent input/output request in the input/output queue;
merging all input/output requests in the input/output queue;
splitting an input/output request into separate input/output requests; and
reordering input/output requests in the input/output queue.

6. A method comprising:
performing experimentation on an input/output queue comprising one or more input/output requests to a target information handling resource, the experimentation including performing one or more modifications of the input/output queue to determine thermal impact resulting from the one or more modifications;
storing results of the experimentation; and
based on the experimentation, determining additional modifications to be made to the input/output queue in order to provide a minimal impact to performance of input/output requests at the target information handling resource while satisfying thermal constraints of the target information handling resource;
wherein performing experimentation and determining additional modifications comprises:
determining whether a current state of the input/output queue matches a previous queue state for which a modification was made that had a positive thermal impact to the target information handling resource;
responsive to determining that the current state fails to match the previous queue state; modifying the input/output queue;
recording a pattern of the current state, the modification made to the input/output queue, a thermal impact associated with the modification, and a performance impact associated with the modification; and
modifying the input/output queue in the same manner as was the previous queue state responsive to determining that the current state matches the previous queue state.

7. The method of claim 6, wherein the target information handling resource comprises a storage resource.

8. The method of claim 7, wherein the storage resource comprises NAND flash.

9. The method of claim 6, wherein performing experimentation and determining modifications to the input/output queue are responsive to at least one of:
a temperature associated with the target information handling resource exceeding a threshold maximum temperature; and
the temperature associated with the target information handling resource having a rate of change exceeding a threshold maximum rate.

10. The method of claim 6, wherein the modifications comprise one or more of:
delaying one or more input/output requests;
merging an input/output request with a subsequent input/output request in the input/output queue;
merging all input/output requests in the input/output queue;
splitting an input/output request into separate input/output requests; and
reordering input/output requests in the input/output queue.

11. An article of manufacture comprising:
a non-transitory computer-readable medium; and computer-executable instructions carried on the computer-readable medium, the instructions readable by a processor, the instructions, when read and executed, for causing the processor to:
perform experimentation on an input/output queue comprising one or more input/output requests to a target information handling resource, the experimentation including performing one or more modifications of the input/output queue to determine thermal impact resulting from the one or more modifications;
store results of the experimentation; and
based on the experimentation, determine additional modifications to be made to the input/output queue in order to provide a minimal impact to performance of input/output requests at the target information handling resource while satisfying thermal constraints of the target information handling resource;
wherein performing experimentation and determining additional modifications comprises: determining whether a current state of the input/output queue matches a previous queue state for which a modification was made that had a positive thermal impact to the target information handling resource;
responsive to determining that the current state fails to match the previous queue state; modifying the input/output queue;
recording a pattern of the current state, the modification made to the input/output queue, a thermal impact associated with the modification, and a performance impact associated with the modification; and
modifying the input/output queue in the same manner as was the previous queue state responsive to determining that the current state matches the previous queue state.

12. The article of claim 11, wherein the target information handling resource comprises a storage resource.

13. The article of claim 12, wherein the storage resource comprises NAND flash.

14. The article of claim 11, wherein the instructions cause the processor to perform experimentation and determine modifications to the input/output queue responsive to at least one of:
a temperature associated with the target information handling resource exceeding a threshold maximum temperature; and
the temperature associated with the target information handling resource having a rate of change exceeding a threshold maximum rate.

15. The method of claim 11, wherein the modifications comprise one or more of:
delaying one or more input/output requests;
merging an input/output request with a subsequent input/output request in the input/output queue;
merging all input/output requests in the input/output queue;
splitting an input/output request into separate input/output requests; and
reordering input/output requests in the input/output queue.

* * * * *

UNITED STATES PATENT AND TRADEMARK OFFICE
CERTIFICATE OF CORRECTION

PATENT NO. : 9,760,402 B2
APPLICATION NO. : 14/807621
DATED : September 12, 2017
INVENTOR(S) : Thomas Alexander Shows et al.

Page 1 of 3

It is certified that error appears in the above-identified patent and that said Letters Patent is hereby corrected as shown below:

In the Claims

Column 8, Lines 6 - 49 please amend Claim 1 as follows:
1. An information handling system comprising:
    a processor;
    a target information handling resource for receiving input/output requests from an operating system executing on the processor; and
    a thermal filter driver comprising a program of instructions embodied in computer-readable media and executable by the processor, the thermal filter driver configured to, in response to issuance of one or more input/output requests to the target information handling resource:
        perform experimentation on an input/output queue comprising the one or more input/output requests, the experimentation including performing one or more modifications of the input/output queue to determine thermal impact resulting from the one or more modifications;
        store results of the experimentation; and
        based on the experimentation, determine additional modifications to be made to the input/output queue in order to provide a minimal impact to performance of input/output requests at the target information handling resource while satisfying thermal constraints of the target information handling resource;
        wherein the thermal filter driver is further configured to, in order to perform experimentation and determine additional modifications:
            determine whether a current state of the input/output queue matches a previous queue state for which a modification was made that had a positive thermal impact to the target information handling resource; and
            responsive to determining that the current state fails to match the previous queue state:
                modify the input/output queue; and
                record a pattern of the current state, the modification made to the input/output queue, a thermal impact associated with the modification, and a Signed and Sealed this
Twenty-eighth Day of November, 2017

Joseph Matal
*Performing the Functions and Duties of the
Under Secretary of Commerce for Intellectual Property and
Director of the United States Patent and Trademark Office* performance impact associated with the modification; and
responsive to determining that the current state matches the previous queue state: modify the input/output queue in the same manner as was the previous queue state.

Column 9, Lines 9 - 42 please amend Claim 6 as follows:
6. A method comprising:
performing experimentation on an input/output queue comprising one or more input/output requests to a target information handling resource, the experimentation including performing one or more modifications of the input/output queue to determine thermal impact resulting from the one or more modifications;
storing results of the experimentation; and
based on the experimentation, determining additional modifications to be made to the input/output queue in order to provide a minimal impact to performance of input/output requests at the target information handling resource while satisfying thermal constraints of the target information handling resource;
wherein performing experimentation and determining modifications comprises:
determining whether a current state of the input/output queue matches a previous queue state for which a modification was made that had a positive thermal impact to the target information handling resource;
responsive to determining that the current state fails to match the previous queue state: modifying the input/output queue;
recording a pattern of the current state, the modification made to the input/output queue, a thermal impact associated with the modification, and a performance impact associated with the modification; and
modifying the input/output queue in the same manner as was the previous queue state responsive to determining that the current state matches the previous queue state.

Column 10, Lines 3 - 37 please amend Claim 11 as follows:
11. An article of manufacture comprising:
a non-transitory computer-readable medium; and
computer-executable instructions carried on the computer-readable medium, the instructions readable by a processor, the instructions, when read and executed, for causing the processor to:
perform experimentation on an input/output queue comprising one or more input/output requests to a target information handling resource, the experimentation including performing one or more modifications of the input/output queue to determine thermal impact resulting from the one or more modifications;
store results of the experimentation; and
based on the experimentation, determine additional modifications to be made to the input/output queue in order to provide a minimal impact to performance of input/output requests at the target information handling resource while satisfying thermal constraints of the target information handling resource;
wherein performing experimentation and determining additional modifications comprises:
determining whether a current state of the input/output queue matches a previous queue state for which a modification was made that had a positive thermal impact to the target information handling resource;

responsive to determining that the current state fails to match the previous queue state: modifying the input/output queue;

recording a pattern of the current state, the modification made to the input/output queue, a thermal impact associated with the modification, and a performance impact associated with the modification; and responsive to determining that the current state matches the previous queue state:

modifying the input/output queue in the same manner as was the previous queue state responsive to determining that the current state matches the previous queue state.